Patented June 17, 1924.

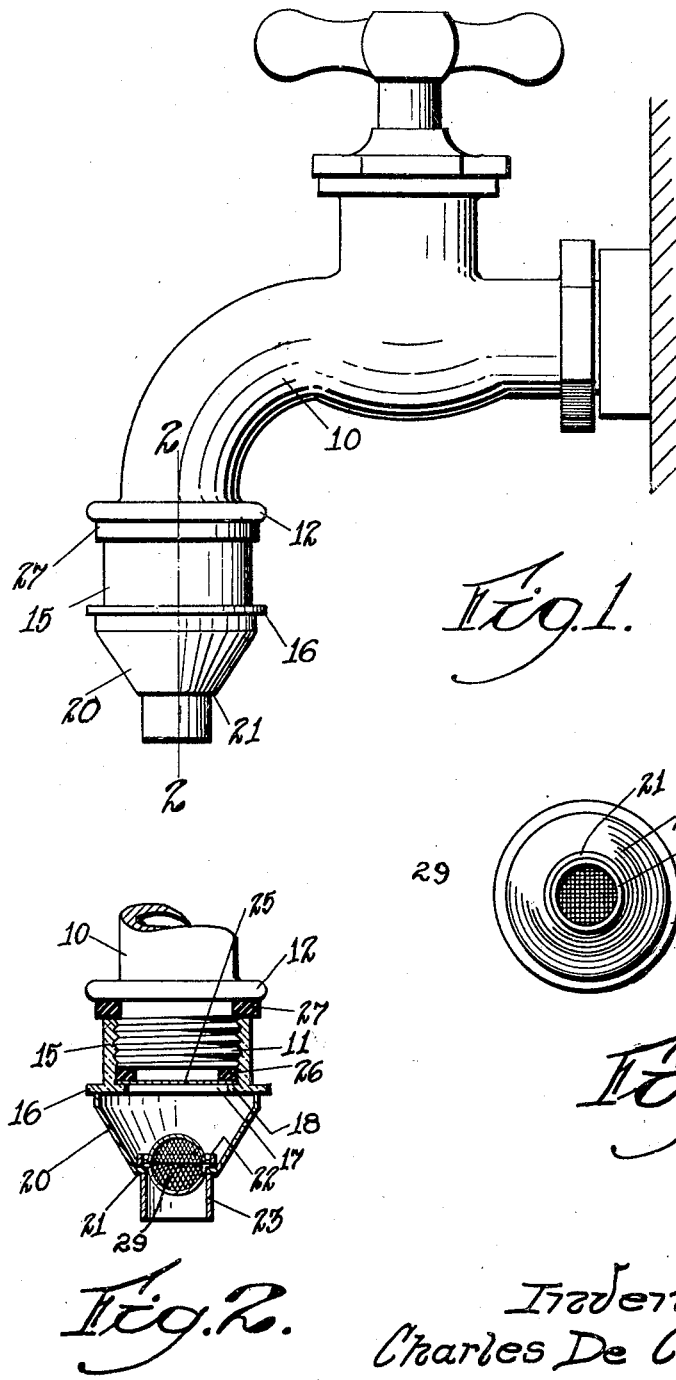

1,497,894

UNITED STATES PATENT OFFICE.

CHARLES DE CAROLIS, OF LEOMINSTER, MASSACHUSETTS.

WATER FILTER.

Application filed March 15, 1923. Serial No. 625,398.

*To all whom it may concern:*

Be it known that I, CHARLES DE CAROLIS, a subject of the King of Italy, who has taken out his first papers, residing at Leominster, in the county of Worcester and State of Massachusetts, have invented a new and useful Water Filter, of which the following is a specification.

This invention relates to a water filter. The principal objects thereof are to provide a rustless filter which on account of this property cannot stick to the pipe or faucet on which it is located; to form the parts in a simple and convenient manner, and to provide them with three separate filtering screens having between them a space for sand or other granular filtering material.

Reference is to be had to the accompanying drawings, in which—

Fig. 1 is a side view of a faucet with a preferred embodiment of this invention applied thereto;

Fig. 2 is a sectional view of the same on the line 2—2 of Fig. 1; and

Fig. 3 is a bottom plan view.

I have shown the invention in the form of a filter applied to the faucet 10. This is provided with an externally screw-threaded end 11, as usual, and flat shoulder 12.

The filter comprises a piece 15 of celluloid in the form of a tube. Ordinary celluloid tubing can be employed. It is screw-threaded on the interior to fit the screw thread 11. On the bottom it is provided with a circular flat plate 16 cemented to its lower flat surface and projecting outwardly around it and also inwardly beyond its inner circumference to provide a large opening 17 and especially to provide a circular shoulder 18 surrounding the opening. The parts 15 and 16 as stated are formed of celluloid and I preferably make them opaque and of some attractive color, as for example, white.

On the bottom of the plate 16 is cemented the end of a conical piece of celluloid 20 constituting a central transparent holder for granular material and consisting of transparent celluloid. This has a flat upper surface which is cemented directly to the bottom of the plate 16 and at the bottom its lower end is bent inwardly to form a horizontal wall 21 having a perforation through it. On the inside there is cemented a ring 22 of opaque celluloid and merely constituting a vertical wall set into the shoulder formed between the conical and horizontal parts of the transparent celluloid piece 20. It sets back from the opening through the flat horizontal wall 21 to form a shoulder above the same and inside the ring. Below these parts is cemented an opaque celluloid ring 23, the upper end being secured to the bottom of the horizontal wall 21 and it being of such size as to register with the opening in this wall.

The parts so far described are all arranged concentrically. On the shoulder 18 is placed a screen 25 formed of woven wire or other desired material. This is flat and extends across the opening 17 being held down by a rubber washer 26. There is also a rubber washer 27 placed above the top of the filter and between that and the shoulder 12.

Inside the ring 22 and above the top of the horizontal wall 21 of the transparent part of the filter are placed two filtering screens 29 each of hemi-spherical formation and arranged with their diameters together and their convex portions extending in opposite directions. These preferably are made of woven wire and they fit frictionally into the ring 22 and are supported by the wall 21.

The transparent conical member 20, between the two sets of screens, preferably is filled with sand or other granular filtering material. By making this part transparent the condition of this material is observable at all times and if it gets packed down so that it prevents the water going through, that fact will be readily apparent and nothing has to be done except to take the filter off the screw threaded end of the faucet, remove the washer 26 and screen 25, and empty out the granular material and refill it. If necessary at this time the screens can be cleaned.

The result of this is a very neat and attractive filter which has no metallic parts and cannot rust in position on the screw threaded end of the faucet. It is always removable and easily cleanable. If any foreign substance gets into the filter it can be detected through the transparent portion.

Although I have illustrated and described only a single form of the invention I am aware of the fact that modifications can be made therein by any person skilled in the art without departing from the scope of the invention as expressed in the claims. Therefore, I do not wish to be limited to all the details of construction herein shown and described but what I do claim is:—

1. As an article of manufacture, a filter for the purpose described having an upper portion comprising a tubular piece of celluloid having a screw threaded interior and a flat plate of celluloid on the bottom thereof and having a large passage therethrough but projecting inwardly beyond the inner surface of the screw threaded portion to form a shoulder, a piece of celluloid of general conical formation on the bottom of said plate, a tube of celluloid on the bottom of the conical piece of celluloid, and a ring of celluloid inside the conical member and spaced from the bottom thereof to provide a shoulder.

2. As an article of manufacture, a filter for the purpose described having an upper portion comprising a tubular piece of celluloid having a screw threaded interior and a flat plate of celluloid cemented to the bottom thereof and having a large passage therethrough but projecting within the screw threaded portion to form a shoulder, a transparent piece of celluloid cemented to the bottom of said plate, a tube of celluloid cemented to the bottom of the transparent piece of celluloid and a ring cemented inside the transparent member and spaced from the bottom thereof to provide a shoulder.

3. As an article of manufacture, a filter for the purpose described comprising a tubular piece of celluloid having a screw threaded interior and a flat plate of celluloid on the bottom thereof and having a large passage therethrough but extending inwardly to form a shoulder, a central piece of celluloid on the bottom of said plate, a tube of celluloid on the bottom of the central piece of celluloid, a ring of celluloid inside the central member and spaced from the bottom thereof to provide a shoulder, a flat woven wire screen resting on the first named shoulder, a rubber washer resting on the first named shoulder, inside the screw threaded portion to hold said screen in place, and a pair of oppositely convex screens having their edges resting on the second shoulder, one of the screens projecting below it and the other above it.

4. As an article of manufacture, a filter for the purpose described comprising a tubular piece having a screw threaded interior and a flat plate cemented to the bottom thereof and having a large passage therethrough but projecting inwardly to form a shoulder, a transparent piece of general conical formation cemented to the bottom of said plate, a tube cemented to the bottom of the transparent piece, and a ring cemented inside the transparent member and spaced from the bottom thereto to provide a shoulder, the interior of said transparent portion being filled with granular filtering material.

In testimony whereof I have hereunto affixed my signature.

CHARLES DE CAROLIS.